United States Patent [19]

Williams et al.

[11] Patent Number: 5,467,641

[45] Date of Patent: Nov. 21, 1995

[54] METHOD OF AND APPARATUS FOR DETECTING FUEL SYSTEM LEAK

[75] Inventors: David Williams, Warwickshire; Stuart M. Briscoe, Wolverhampton, both of England; Keith Melbourne, Perth, Australia

[73] Assignee: Lucas Industries Public Limited Company, England

[21] Appl. No.: 194,950

[22] Filed: Feb. 14, 1994

[30] Foreign Application Priority Data

Feb. 13, 1993 [GB] United Kingdom ............... 9302958

[51] Int. Cl.⁶ ................................................ G01M 3/32
[52] U.S. Cl. ..................... 73/49.7; 73/49.2; 73/40.5 R; 340/605
[58] Field of Search ........................ 73/49.7, 49.1, 73/49.2 R, 49.2 T

[56] References Cited

U.S. PATENT DOCUMENTS

| | | | |
|---|---|---|---|
| 4,608,857 | 9/1986 | Mertens et al. | 73/40.5 R |
| 4,625,545 | 12/1986 | Holm et al. | 73/40 |
| 4,837,707 | 6/1989 | Giometti et al. | 364/552 |
| 4,876,530 | 10/1989 | Hill et al. | 340/605 |
| 5,267,470 | 12/1993 | Cook | 73/49.7 |
| 5,361,622 | 11/1994 | Wall | 73/49.2 |
| 5,369,984 | 12/1994 | Rodgers et al. | 73/49.2 |

FOREIGN PATENT DOCUMENTS

| | | | |
|---|---|---|---|
| 4132926 | 5/1992 | Japan | 73/49.2 |
| 5052700 | 3/1993 | Japan | 73/49.1 |

*Primary Examiner*—Hezron E. Williams
*Assistant Examiner*—J. David Wiggins
*Attorney, Agent, or Firm*—Andrus, Sceales, Starke & Sawall

[57] ABSTRACT

The existence of an unacceptable vapor leak can be determined by monitoring the pressure within a fuel system of an internal combustion engine. Once the engine is switched off, a period is timed to allow pressure variations due to movement of the fuel to subside to an acceptable level. The fuel system is closed and a first rate of pressure increase is determined by measuring a first time taken for the pressure to rise by a predetermined amount. A leak of a predetermined size is then introduced and a second rate of pressure increase is determined by measuring a second time taken for the pressure to rise by a predetermined amount. The first and second times are then compared to detect whether or not an unacceptable leak exists.

10 Claims, 5 Drawing Sheets

METHOD OF AND APPARATUS FOR DETECTING FUEL SYSTEM LEAK

BACKGROUND OF THE INVENTION

The present invention relates to a method of and apparatus for detecting a fuel system leak.

In order to reduce hydrocarbon emissions from fuel systems of vehicles fitted with internal combustion engines, it is known to vent the system through a canister containing charcoal for removing the hydrocarbons before they can be released to the atmosphere. However, should an unacceptable leak occur between the canister and the remainder of the fuel system, fuel vapour can leak to the atmosphere, thus releasing hydrocarbons. Forthcoming legislation requires that any such leak should be no greater than approximately 1 $mm^2$ and it is necessary to test fuel systems so as to detect an unacceptably large vapour leak from the fuel system. This test should be applied by the vehicle engine management system.

Various proposals have been made for testing fuel systems for unacceptable leaks. Such techniques rely on pressurising or depressurising the fuel system to assess the size of any leak. However, such techniques are performed while the engine is running and the vehicle is moving. Movement of the vehicle causes movement or sloshing of fuel in a fuel tank and this gives rise to problems in accurately assessing the degree of vapour leakage by causing unpredictable variations in pressure.

SUMMARY OF THE INVENTION

According to a first aspect of the invention, there is provided a method of detecting an unacceptable vapour leak in a fuel system of a vehicle internal combustion engine, comprising performing a pressure test while the engine is switched off, the pressure test comprising closing the fuel system and measuring a first rate of pressure rise in the fuel system, introducing a predetermined vapour leak into the fuel system and measuring a second rate of pressure rise in the fuel system, and comparing the first and second rates of pressure rise to detect the presence of an unacceptable vapour leak.

According to a second aspect of the invention, there is provided an apparatus for detecting an unacceptable vapour leak in a fuel system of a vehicle internal combustion engine, comprising:

detecting means for detecting when the engine is switched off;

pressure measuring means for measuring pressure in the fuel system;

closing means for closing the fuel system;

introducing means for introducing a predetermined vapour leak into the fuel system;

first means responsive to the detecting means and the pressure measuring means for determining a first rate of pressure rise in the fuel system when the closing means is operated to close the fuel system;

second means responsive to the detecting means and the pressure measuring means for determining a second rate of pressure rise in the fuel system when the introducing means is operated to introduce the predetermined vapour leak into the fuel system; and comparing means for comparing the first and second rates of pressure rise to detect the presence of an unacceptable vapour leak.

BRIEF DESCRIPTION OF THE DRAWINGS

The invention will be further described, by way of example, with reference to the accompanying drawings, in which.

DETAILED DESCRIPTION OF THE PREFERRED EMBODIMENT

Figure 1:
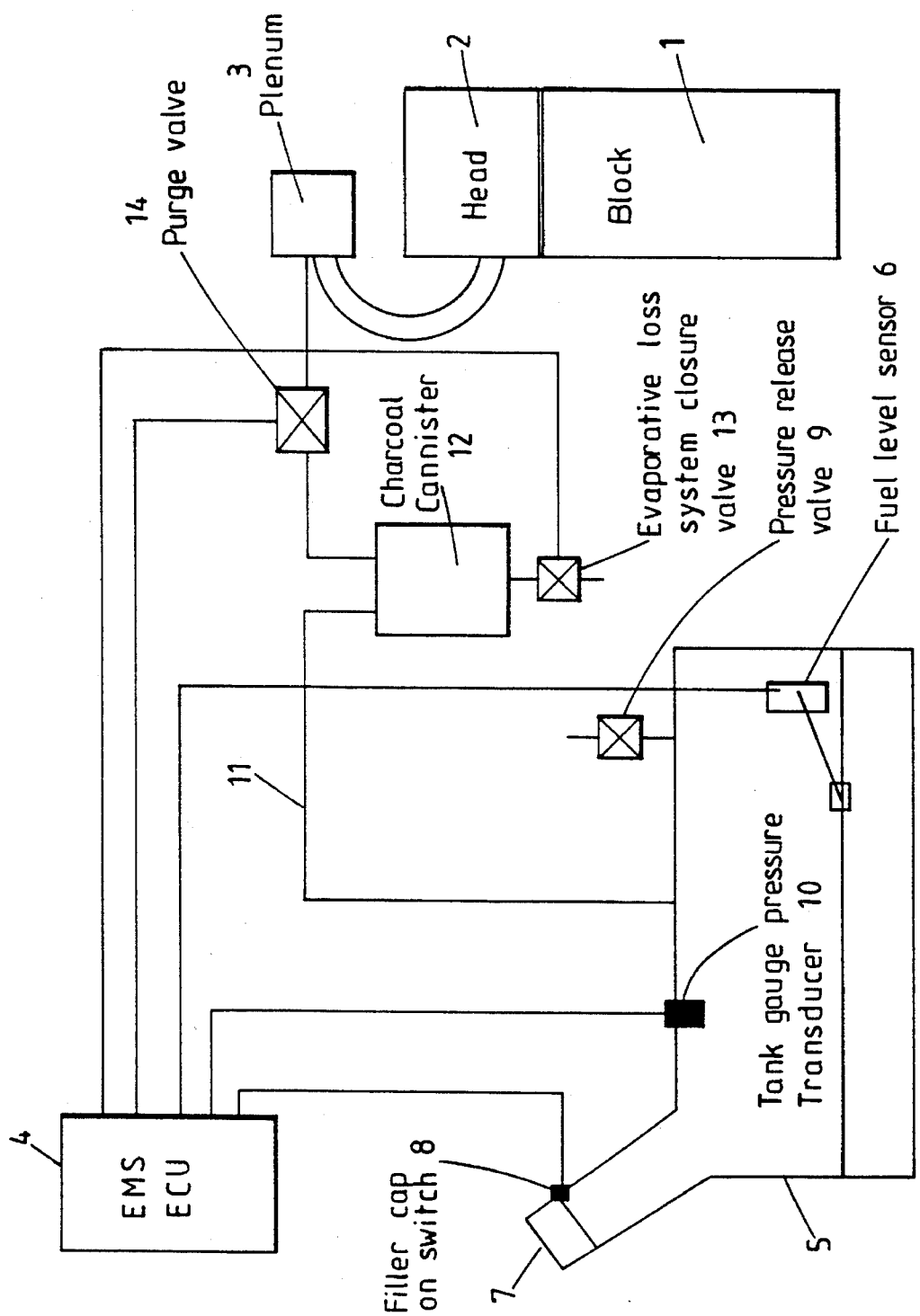
FIG. 1 is a schematic diagram illustrating a leak detecting apparatus constituting an embodiment of the invention.

A vehicle internal combustion engine comprises an engine block 1 and a cylinder head 2. The cylinder head 2 is connected to a plenum 3 forming part of an induction system of the engine. Operation of the engine, including control of ignition and fuelling, is controlled by an engine management system 4 including an electronic control unit.

The vehicle incorporates a fuel system including a fuel tank 5 provided with a fuel level sensor 6 and a fuel filler cap 7 monitored by a filler cap switch 8 to check that the filler cap 7 is fitted. The switch 8 is connected to the engine management system 4. The fuel tank 6 is further provided with a pressure release valve 9 and a tank gauge pressure transducer 10. The valve 9 is arranged to open so as to vent the fuel tank 5 and the remainder of the fuel system in order to prevent unacceptably high vapour pressures from occurring within the tank and fuel system. The pressure transducer 10 measures the pressure within the fuel system relative to atmospheric pressure and supplies a signal representing the pressure, which may be above or below atmospheric pressure, to the engine management system 4.

The fuel tank 5 has a venting arrangement comprising a pipe 11 connected via a charcoal canister 12 and an evaporative loss system closure valve 13 to the atmosphere for releasing excess pressure. The valve 13 comprises a solenoid valve controlled by the engine management system 4. The charcoal canister 12 is further connected via a solenoid purge valve 14 controlled by the engine management system 4 to the plenum 3.

During normal operation of the engine, the system closure valve 13 is kept open by the engine management system 4 whereas the purge valve 14 is kept closed. Thus, the fuel tank 5 and the fuel system are vented to the atmosphere via the charcoal canister 12 and the valve 13 so as to prevent pressurising or depressurising of the fuel system. Excess gas from the fuel system passes through the charcoal canister 12, where hydrocarbons resulting from fuel evaporation are removed so as to prevent the release of hydrocarbons to the atmosphere via the valve 13. The purge valve 14 is designed to control the rate of purge of fuel from the canister 12 and may be driven by a variable mark/space ratio signal from the ECU.

Figure 2:
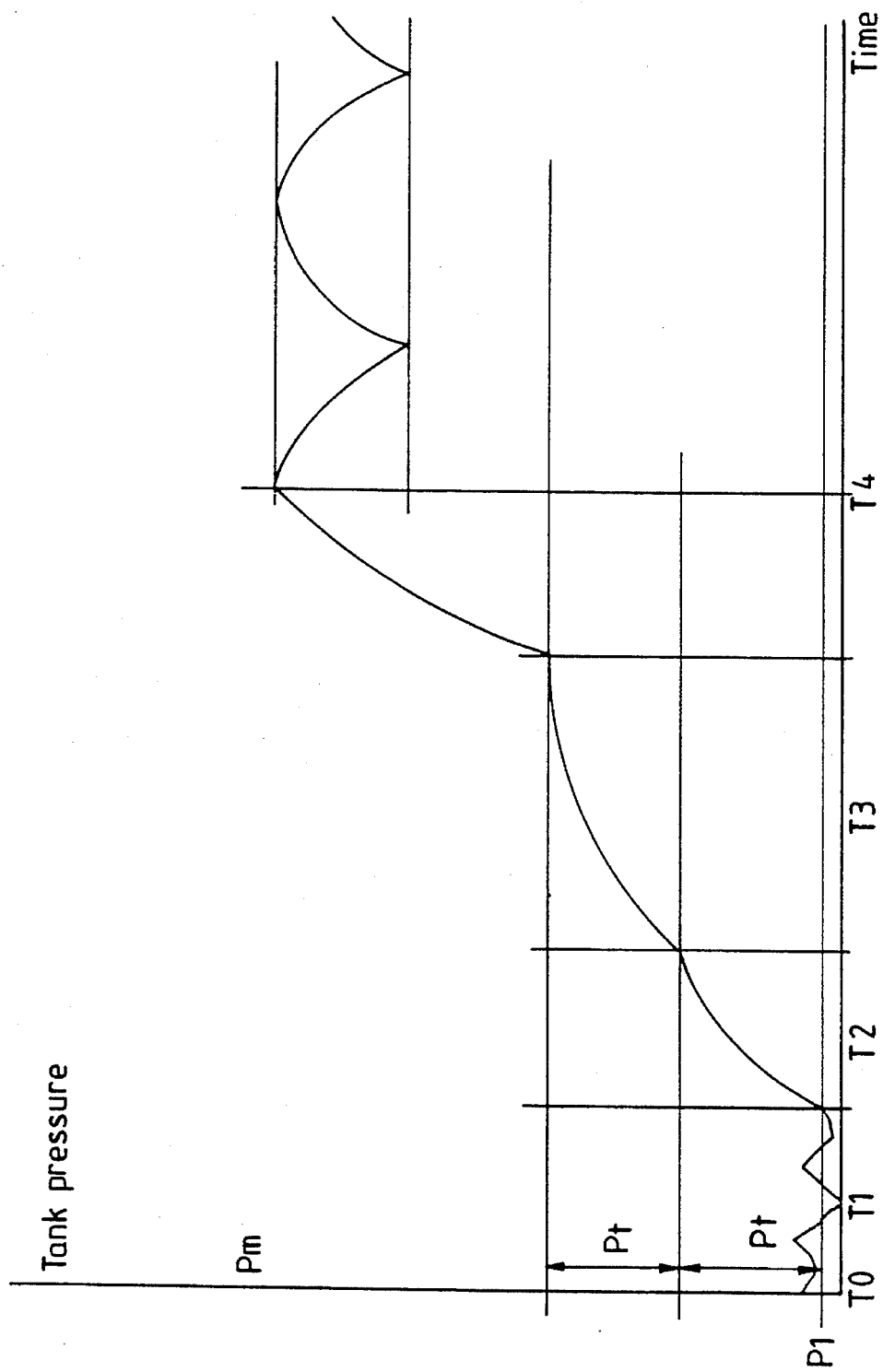
FIG. 2 is a graph of pressure against time illustrating operation of the apparatus of FIG. 1.
Figure 3:
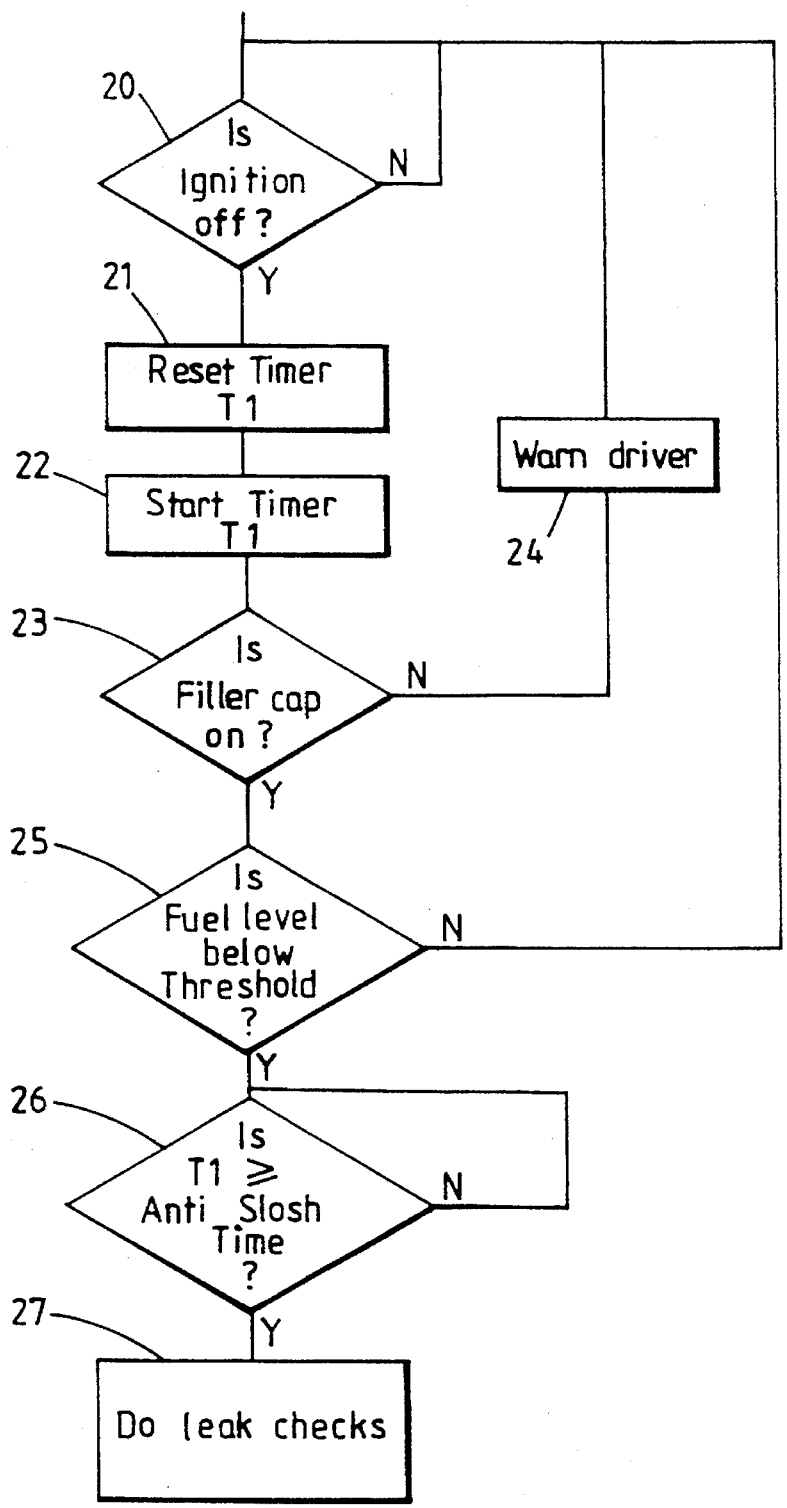
FIGS. 3 to 5 are flow diagrams illustrating a method constituting an embodiment of the invention.

The electronic control unit within the engine management system 4 comprises a data processor programmed to perform various engine management functions. Additionally, the data processor is programmed to perform the method steps illustrated in FIGS. 3 to 5 in order to provide fuel system leak detection when the engine is switched off. FIG. 2 illustrates the fuel tank pressure as measured by the transducer 10 during leak detection against time starting from time T0 when the engine is switched off. A step 20 determines whether the ignition is switched off and, when this occurs, a step 21 resets a timer T1 and a step 22 starts the timer T1. A step 23 checks the status of the filler cap on switch 8 to determine whether the filler cap is correctly closed and; if not, a driver warning is issued at 24 and control is returned to the step 20. If the filler cap is properly closed, a step 25 monitors the fuel level sensor 6 to determine whether the fuel level is below a threshold. If the fuel level is above the threshold, insufficient fuel evaporation will take place in order to perform the leak detection, and control returns to the step 20. If the fuel level is below the threshold, a step 26 checks whether the timer T1 has timed out and, when this occurs, the leak checks are performed at 27. Thus, before the leak checks commence, the engine management system 4 ensures that the filler cap is closed and the fuel level in the tank 5 is sufficiently low to permit proper leak testing. By waiting for a time period shown as T1 in FIG. 2, excessive movement or sloshing of fuel in the fuel tank 5 subsides so as not to effect the leak testing. Additionally, the pressure measured by the transducer 10 and/or the fuel level measured by the sensor 6 may be monitored by the data processor so as to prevent testing from commencing until pressure variations and fuel level movements have fallen to acceptably low levels to permit proper testing to commence.

Figure 4:
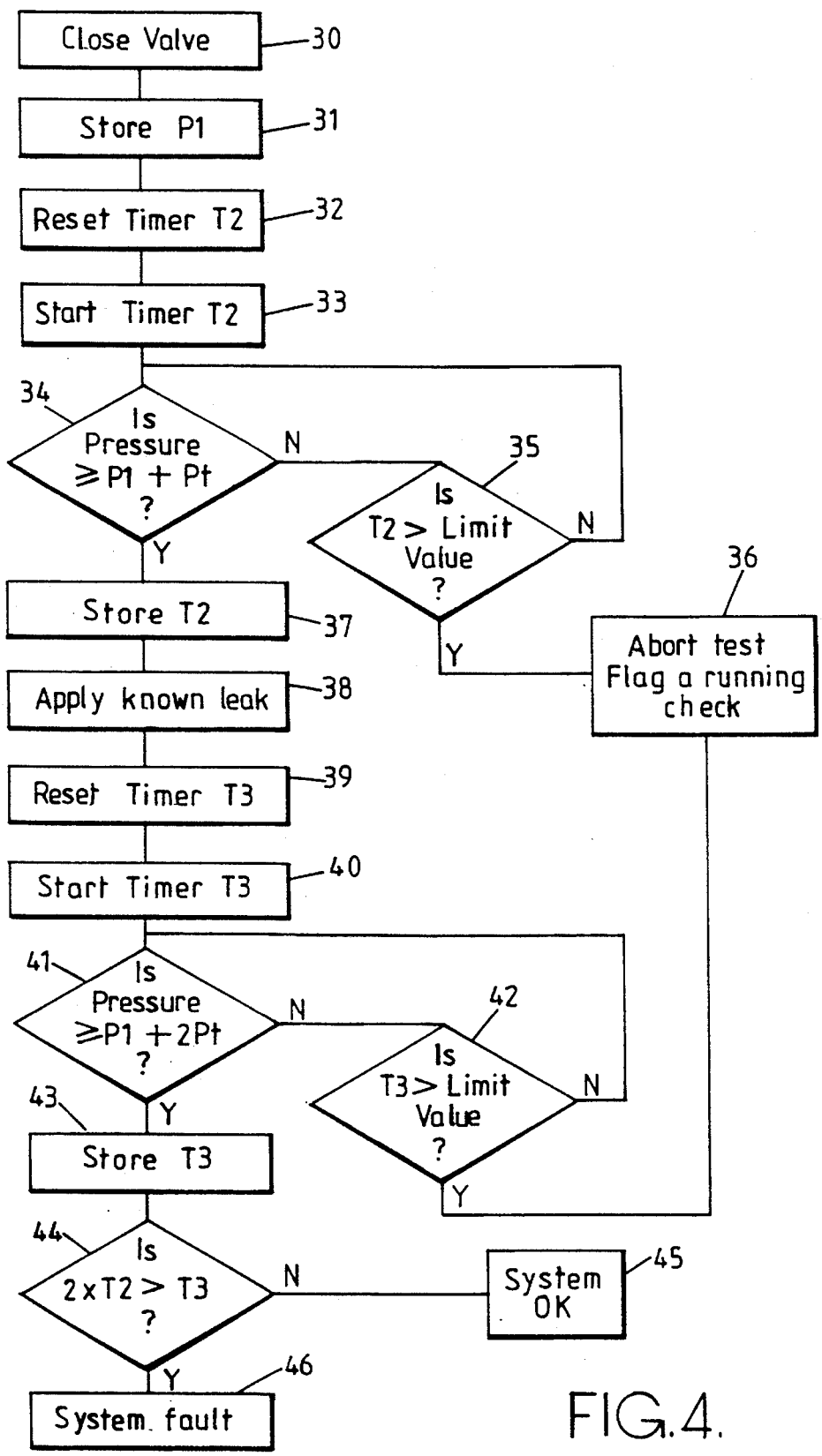

The leak test 27 is illustrated in FIG. 4. At 30, the evaporative loss system closure valve 13 is closed and at 31 the initial pressure P1 as determined by the transducer 10 is stored. A timer T2 is reset at 32 and started at 33. A check is made at 34 as to whether the pressure measured by the transducer 10 has increased by Pt. If not, a step 35 checks whether the timer T2 has exceeded a limit time period and, if not, control is returned to the step 34. If the limit time period has been exceeded, a step 36 aborts the leak test and flags a running check, which will be described with reference to FIG. 5.

If the pressure measured by the transducer 10 reaches the value P1+Pt before the timer T2 exceeds the limit time period, the time period is stored at 37. This corresponds to the time period T2 illustrated in FIG. 2. A predetermined known leak is introduced in to the fuel system at 38, for instance equivalent to a vapour leak through a hole having an area of 1 mm². This may be provided by arranging the valve 13 to create such a leak under control of the engine management system 4. Alternatively, the purge valve 14 may be operated by the engine management system so as to provide an effective leak of this size to the plenum 3 and hence back through the induction system to the atmosphere. The purge valve 14 has two states and the degree of leakage can be controlled by supplying a pulse waveform of appropriate mark/space ratio to the solenoid purge valve 14 so as to create a leak which is equivalent, over the time period of the test, to a hole of area 1 mm².

At 39, a timer T3 is reset and started at 40. A step 41 checks whether the pressure monitored by the transducer 10 has been incremented by a further increment Pt. If not, a step 42 checks whether the timer T3 has exceeded a limit value and, if so, control passes to 36 so that the test is aborted and a running check is flagged. If the limit value for the timer T3 is not exceeded and the pressure within the fuel tank 5 reaches the target value P1+2Pt, the timer value is stored at 43. This corresponds to the time interval T3 illustrated in FIG. 2. The time intervals T2 and T3 are checked at 44 to ascertain whether twice the time interval T2 is greater than the time interval T3 if not, the system is indicated as being acceptable at 45. Otherwise, a system fault is indicated at 46.

Thus, if a leak in the fuel system exceeds the maximum acceptable value (1 mm² in area in the present embodiment), then the rate of rise of pressure caused by fuel evaporation in the fuel system will be less than twice the rate of rise when the controlled leak is applied, so that the apparatus can detect the presence of an unacceptably large leak. In the absence of a leak or where an acceptably small fuel system leak occurs, the rate of pressure rise in the first part of the test will be greater than twice the rate of pressure rise during the second part of the test. It is therefore possible to detect whether an unacceptable leak has occurred within the fuel system.

FIG. 2 illustrates operation after the leak test has been performed. At the end of the time period T3, the valves 13 and 14 are closed and the pressure within the tank 5 and the fuel system rises to a maximum permitted value Pm at time T4. The engine management system 4 opens the valve 13 so as to vent excess pressure to the atmosphere via the charcoal canister 12 until the tank pressure falls to an acceptable value, whereupon the valve 13 is again closed. The pressure then rises to the maximum value Pm again and the valve 13 is opened, this cycle of operation being repeated so as to prevent the pressure from exceeding the maximum value Pm while minimising the loss of fuel vapour.

If at any time during the test the ignition is turned on again or the filler cap 7 is opened, the test is aborted.

The pressure release valve 9 is set to open at a predetermined pressure greater than the maximum pressure Pm so as to provide a safety valve for preventing excess pressurisation of the fuel system in the event of a failure preventing the valve 13 from being opened to release pressure. The engine management system 4 may be arranged to give a warning if the pressure measured by the transducer 10 exceeds the maximum pressure Pm, so that remedial action may be taken to detect the fault and make a repair.

Figure 5:
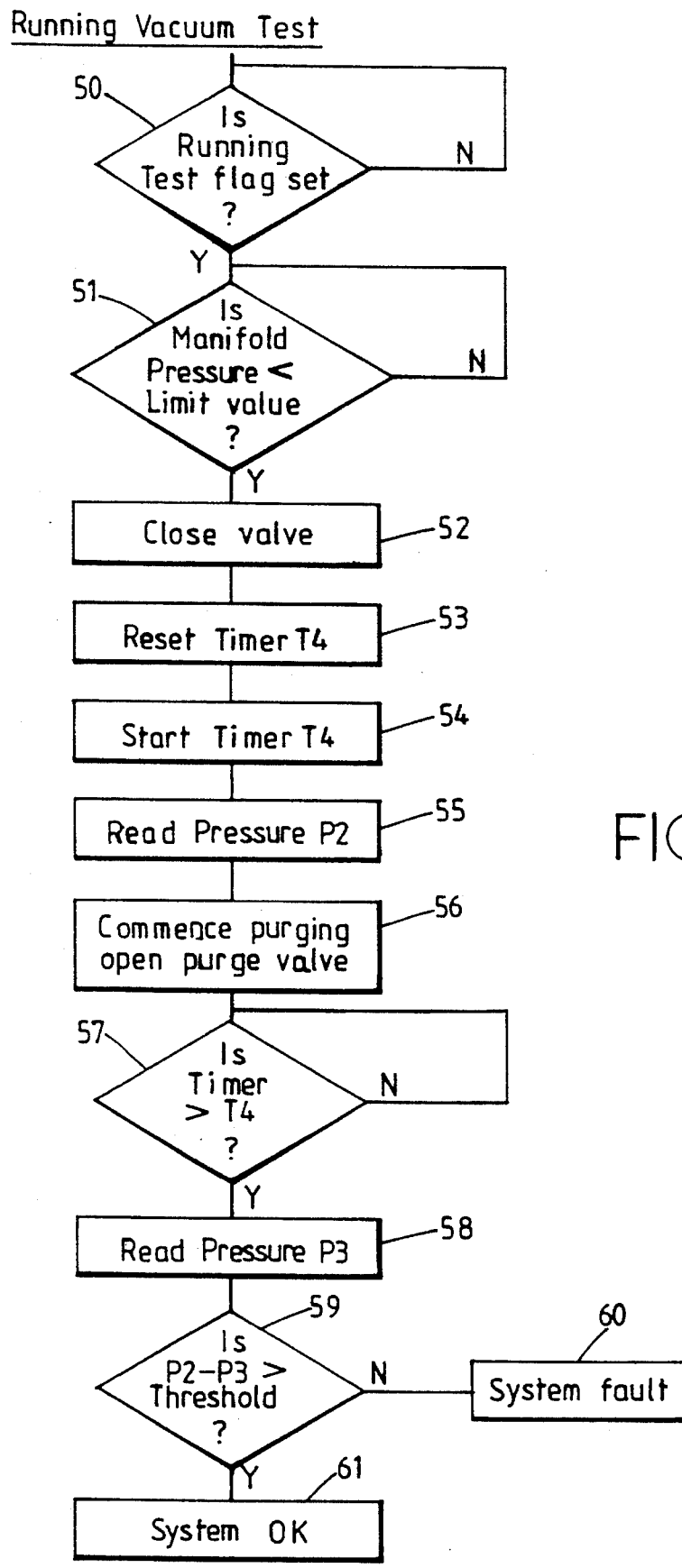

If the timer T2 or timer T3 times out in the steps 35 and 43, this may be because the system has a large leak or there is insufficient fuel vapour pressure to obtain the necessary pressure rise. Under these circumstances during the next vehicle trip, with the engine running the routine shown in FIG. 5 is performed. At 50 the status of the running flag is checked and if set at step 36 in FIG. 4 the inlet manifold depression is checked at step 51. The manifold depression may be calculated by the engine management system from air mass flow, engine speed and intake air temperature. If the manifold depression is greater than a set level then a running check may be performed. Valve 13 is closed at step 52 and timer T4 is reset and started at steps 53 and 54 respectively. The tank pressure P2 is read and stored at 55. The purge valve is opened at step 56. After a predetermined time period is timed by timer T4 at step 57, the tank pressure P3 is again read and stored at step 58. At step 59 the pressure drop P2-P3 which has occurred in time interval T4 is compared with a threshold value. If this pressure drop is less than the threshold value then a system leak is flagged at step 60. Otherwise the system is flagged as being operational at step 61.

In the presence of a genuine leak, the time period timed by the timer T4 and the pressure threshold are such that the predetermined pressure drop cannot be achieved if a large leak is present. However, if the pressure drop can be achieved within this time period, then insufficient fuel vapour was being generated by the fuel during the leak test and a large leak is not present.

In suitably equipped engines, this test may be cross-checked against the amount of vapour purged during a previous trip by monitoring the amount of lambda feedback fuel correction.

It is thus possible to provide an apparatus for and a method of detecting an unacceptably large vapour leak in a fuel system with increased reliability. Leak testing is substantially unaffected by fuel movement or sloshing in the fuel tank 5 and testing is only performed when conditions appropriate to reliable testing exist.

We claim:

1. A method of detecting an unacceptable vapour leak in a fuel system of a vehicle internal combustion engine, including a fuel tank containing liquid fuel comprising performing a fuel system pressure test while the engine is switched off, said pressure test comprising closing said fuel system and measuring a first rate of vapour pressure rise in said fuel system resulting from evaporation of fuel in the fuel tank, introducing a predetermined vapour leak into said fuel system and measuring a second rate of vapour pressure rise in said fuel system including a fuel tank containing liquid fuel, and comparing said first and second rates of pressure rise to detect the presence of an unacceptable vapour leak.

2. A method as claimed in claim 1, in which at least one of a predetermined delay and monitoring of variations of pressure within said fuel system is performed so as to inhibit testing until pressure variations resulting from excessive movement of fuel in the fuel tank have fallen to acceptably low levels.

3. A method as claimed in claim 1, in which said first rate of pressure rise is measured by measuring a first period taken for the pressure to rise by a first predetermined amount, and said second rate of pressure rise is measured by measuring a second period taken for the pressure to rise by a second predetermined amount.

4. A method as claimed in claim 3, in which said second predetermined amount is equal to said first predetermined amount, said predetermined vapour leak is equal to a largest acceptable vapour leak, and the existence of an unacceptable vapour leak is determined when said second period is less than twice said first period.

5. A method as claimed in claim 1, in which a further test is performed when at least one of the first rate of pressure rise and the second rate of pressure rise is less than a respective limit value, said further test being performed during a period of engine operation and comprising measuring a rate of pressure decrease in said fuel system, and determining that an unacceptable vapour leak is present when the rate of pressure decrease is less than a predetermined value.

6. An apparatus for detecting an unacceptable vapour leak in a fuel system of a vehicle internal combustion engine including a fuel tank containing liquid fuel, said apparatus comprising:

an engine monitor for detecting when said engine is switched off;

a pressure sensor for measuring vapour pressure in said fuel system;

a closing valve for closing said fuel system;

an introducing valve for introducing a predetermined leak into said fuel system;

a first pressure rise measuring device responsive to said engine monitor and said pressure sensor, for determining a first rate of vapour pressure rise in said fuel system resulting from evaporation of fuel in the fuel tank when said closing valve is operated to close said fuel system;

a second pressure rise measuring device responsive to said engine monitor and said pressure sensor for determining a second rate of vapour pressure rise in said fuel system resulting from evaporation of fuel in the fuel tank when said introducing valve is operated to introduce said predetermined vapour leak into said fuel system; and a comparator for comparing the first and second rates of pressure rise to detect the presence of an unacceptable vapour leak.

7. An apparatus as claimed in claim 6, further comprising an inhibitor means arranged to perform at least one of a predetermined delay and monitoring of variations of pressure within said fuel system, so as to inhibit said first and second pressure rise measuring devices until pressure variations resulting from excessive movement of fuel in the fuel tank have fallen to acceptably low levels.

8. An apparatus as claimed in claim 6, in which said first pressure rise measuring device is arranged to measure said first rate of pressure rise by measuring a first period taken for the pressure to rise by a first predetermined amount, and said second pressure rise measuring device is arranged to measure said second rate of pressure rise by measuring a second period taken for the pressure to rise by a second predetermined amount.

9. An apparatus as claimed in claim 8, in which said second predetermined amount is equal to said first predetermined amount, said predetermined vapour leak is equal to a largest acceptable vapour leak, and the existence of an unacceptable vapour leak is determined when said second period is less than twice said first period.

10. An apparatus as claimed in claim 6, said engine having an engine manifold and said apparatus further comprising a further test apparatus for performing a further test when at least one of said first rate of pressure rise and said second rate of pressure rise is less than a respective limit value, said further test apparatus being arranged, during a period of engine operation, to measure a rate of pressure decrease in said fuel system, and to determine that an unacceptable leak is present when the rate of pressure decrease is less than a predetermined value.

* * * * *